March 24, 1964     E. E. STAHLY     3,126,412
COMPOUND N,N'-DI-(3,5,5-TRIMETHYLCYCLOHEXYL)-P-PHENYLENEDIAMINE
Filed Nov. 22, 1954
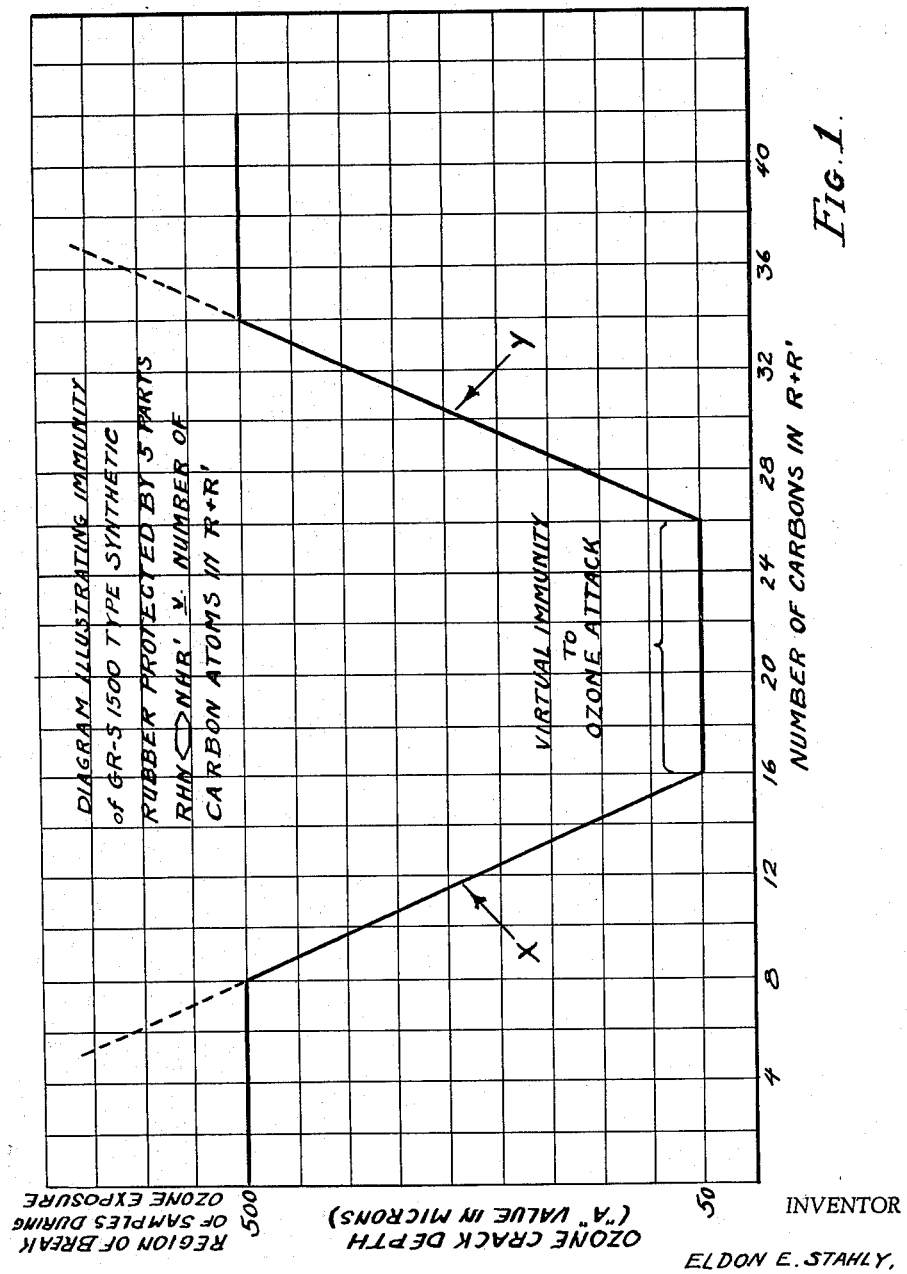
INVENTOR
ELDON E. STAHLY,
BY *Hall & Houghton*
ATTORNEY United States Patent Office 3,126,412
Patented Mar. 24, 1964

3,126,412
COMPOUND N,N'-DI-(3,5,5-TRIMETHYLCYCLO-
HEXYL)-p-PHENYLENEDIAMINE
Eldon E. Stahly, Grosse Pointe, Mich., assignor, by direct
and mesne assignments, of three-fourths to Oliver W.
Burke, Jr., Grosse Pointe, Mich., and one-fourth to
Eastman Kodak Company, Rochester, N.Y., a corporation of New Jersey
Filed Nov. 22, 1954, Ser. No. 470,401
1 Claim. (Cl. 260—577)

The present invention relates to a new class of valuable antiozidants for vulcanizable elastomers such as natural rubber and synthetic elastomers such as polybutadiene, GR–S type synthetic rubbers, and other diene vinyl copolymers such as acrylonitrile-butadiene elastomer, etc. The said class of antiozidants is also effective as antiozidants for use in non-vulcanizable elastomers, plastomers and resins, particularly those which have residual unsaturation.

It is well known that many compounds possess the property of preserving rubber, when incorporated therein, against attack by oxygen, light and heat. Such compounds are termed antioxidants. However, the attack by ozone, up to the time of the present invention, has been a problem not solved by the known antioxidants. The present invention aims to provide specific new materials, ingredients, or additives, which protect rubber against deterioration by ozone attack, especially after subjection of the rubbers to elevated temperatures, and which are substantially non-toxic, and have other advantages as well.

The problem of ozone attack on both natural and synthetic rubber goods is of high importance to both civilian and military consumers.

As early as 1944 the ASTM prescribed testing procedure for measuring ozone attack in connection with essentially static goods, such as refrigerator gaskets, windshield mountings and the like. It has more recently been determined that when dynamically flexed rubber goods, such as tires, are made in the usual way, with or without antioxidants, such articles are subject to deterioration by ozone attacks, whether in continuous or intermittent use or in storage. This ozone attack on statically or dynamically employed rubber goods becomes apparent by the development of penetrating cracks which progressively become deeper with time of exposure to the atmosphere, which practically always contains ozone in trace amounts. Such cracks in tires often becomes sufficiently deep to cause failure. Indeed, in the case of new tires stored for substantial periods, such cracks may cause failure within a relatively short time after the tires are put into use. This result of ozone attack is thus quite distinct from the development of fine surface cracks, i.e., checking and crazing, resulting from oxidative deterioration.

Ozone attack is extremely bad in areas indigent to cities, such as Los Angeles, California, where smog conditions are associated with high ozone concentrations, e.g., above 10 parts per hundred million. In Los Angeles and similar high-ozone areas so-called ozone cracks may develop in rubber articles such as tires in less than a month of storage time. In areas such as Detroit, Michigan, the normal ozone concentration in the air is less than 5 parts per hundred million, and ozone cracks may not develop for several months.

In any event ozone-cracking is recognized as one of the heretofore important unsolved problems in storage and use of both civilian and military articles containing natural or synthetic rubber parts.

Previous to the present invention the rubber industry has employed chemicals such as Santoflex AW (the trade name for 6-ethoxy-2,2,4-tri-methyl-1,2-dihydroquinoline) in rubber articles to protect the same against oxidation on aging. From a survey of chemicals used to protect the products of representative manufacturers of rubber goods it appears that Santoflex AW has been regarded as one of the best materials available for that purpose. Accordingly, to demonstrate the ozone resistance afforded by the new additives of this invention, a GR–S compound containing Santoflex AW was compared with GR–S containing other antioxidant materials, to determine which of such materials seemed the most resistant to ozone attack after subjecting to heat aging conditions, and since the Santoflex AW seemed to be the best of the materials so compared, it was used as a standard for comparison to evaluate the greatly improved resistance to such attacks imparted by the new antiozidants of the present invention. In spite of accepted usage of Santoflex AW by the industry it will be noted from the examples cited in Table I, as compared to Tables II and III that relatively little protection of elastomers against ozone cracking is afforded by Santoflex AW, as compared to the antiozidants of the present invention, after the samples had been heated.

The present research has shown that certain diamines may show some protective action against ozone before the sample has been heat-aged. When stored for long periods at 20° C., or when used for shorter periods in applications at higher temperatures such as are reached in normal usage of automobile or truck tires, the protective action is gradually lost. For example, in Sample 3 of Table II, before aging, rubber compounds containing N,N'-di-sec-butyl-p-phenylenediamine show protection against ozone cracking at ordinary temperatures, but after heat aging this protection is absent, and such a compound when employed in tires, would not protect such tires in use. Thus, protective action after heat treatment is properly taken as a measure of efficiency of an additive as a practical antiozidant.

A requisite property in case of antiozidants, as in the case of any other additives to rubber, is inertness with respect to the curing ingredients of the elastomer compound. The compounds after heat aging (24 hours at 100° C. is taken as an exacting standard herein) should still show about 275% or greater elongation to be suitable for tire stocks. Original and heat-aged stress-strain properties were therefore both obtained and are included in the tables of data herein. Certain compounds such as benzidine resulted in a very short stock after aging (see Examples I–32, I–33 and I–36); while protection against ozone was good, such additives caused over-curing, thus rendering them unsuitable for use in GR–S stocks for manufacture of tires and many other articles of commerce.

Thus, principal objects of the present invention are (1) the provisions of the new chemical compounds for incorporation into elastomer and plastomer compositions which will effectively protect the same against ozone-cracking especially after aging or heat aging without deleteriously altering the physical properties of the protected materials, and (2) the provision of elastomer and plastomer articles including such chemicals and rendered ozone resistant thereby.

This invention resides in the (1) new and useful chemical compounds, (2) the incorporating of such compounds into high polymeric materials and latices of such polymeric materials, and (3) the products resulting therefrom, as is herein disclosed and as is more particularly pointed out in the appended claims.

The new materials of this invention herein termed antiozidants, which have been found highly effective for protection of high molecular weight compounds against attack by ozone, are members of a class consisting of substituted p-phenylenediamine in which at least one amino group is a secondary amino group substituted with a radical selected from the class consisting of a secondary alkyl radical and alkyl substituted cycloalkyl radical, and in which the sum total of the hydrocarbon substituent carbon atoms present lies within the range of not less than 16 and not more than 26 and further this invention includes the incorporation of these new chemical compounds into high polymeric materials and the products therefrom.

For simplicity of production it is preferred that each amino group is secondary and that the substituents of the substituted p-phenylenediamine are secondary alkyl groups and that each comprises the same number of carbon atoms within the limits of 8 to 13 carbon atoms.

The appropriate incorporation of the new antiozidants gives virtual immunity against much higher than ordinary atmospheric concentrations of ozone to elastomer compositions even when the same have been subjected to radical heat aging, thus showing that these antiozidants are capable of protecting the products for long periods of time in geographical areas of low ozone concentration, i.e., less than 5 parts per hundred million.

The new compounds for this invention may be prepared in a simple manner by aminative reductions of ketones with p-phenylenediamines and hydrogen. For example, one mole $NH_2$—$C_6H_4$—$NH_2$ plus 2 moles diisobutyl ketone plus hydrogen with a hydrogenating catalyst, such as copper chromite or Raney nickel, under the influence of heat and pressure, produce N,N'-disecondary nonyl derivatives of the diamine, namely,

sec-nonyl-NH—$C_6H_4$—NH-sec-nonyl

The above reaction can be run with one mole of p-phenylenediamine so that the first produce contains

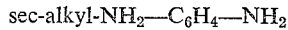

sec-alkyl-$NH_2$—$C_6H_4$—$NH_2$ and this product can be further treated with a second alkyl ketone to effect substitution in the second amino group. There are other practical methods of preparation, and this aminative reduction method is mentioned as illustrative only.

The research has shown that the new compounds are valuable antiozidants for plastomers and resins as well as for natural and synthetic rubbers and are particularly useful antiozidants for tires and like natural and synthetic products subject to ozone attack at high operating temperatures, such as those temperatures attained by heavy duty truck tires, and such temperatures may even rise to 300° F. in use. Anitozidants are herein defined as additive agents which protect the polymeric material, e.g., natural and synthetic rubbers, against deterioration due to ozone attack. While serving as antiozidants, the new compounds also serve as antioxidants, i.e., the new products of this invention protect against crazing and the development of small fine superficial surface cracks in rubber compounds due to attack by oxygen and sunlight. The new compounds are specific and differ from diaryl amines, dialkyl amines, arylenediamines, and their derivatives, in general, in that other members of these general categories will not effectively protect against attack by ozone as is demonstrated by the research summarized hereinafter in Table I.

PREPARATION AND TESTING PROCEDURES

The procedures employed in compounding and testing the elastomeramino-additive compositions for the examples of Tables I, II and IV herein was as follows: as control samples "cold" GR-S synthetic rubber (GR-S 1500 polymerized at 41° F.) was compounded and vulcanized according to best known commercial practice to obtain good aging properties. Then similar compounds were prepared and vulcanized with our new antiozidants present as additives. The recipe employed for the control compound was as follows:

| Components: | Parts by weight |
|---|---|
| GR-S 1500 | 100 |
| HAF carbon black | 40 to 50 |
| EPC carbon black | 0 to 10 |
| Zinc oxide | 3 |
| Stearic acid | 1 to 3 |
| Phenylbetanaphthylamine | 1 to 1.25 |
| Circo Light Oil [1] | 2.5 to 3.5 |
| Para Flux 2016 [1] | 2.5 to 3.5 |
| Sunproof or Heliozone Wax | 1 to 1.5 |
| Santocure (accelerator) [2] | 1.0 |
| Sulfur | 2.0 |
| Santoflex AW | 2.0 |

[1] Commercial plasticizing oils (see book entitled "Compounding Ingredients for Rubber," published 1947 by India Rubber World, New York, N.Y.).
[2] Santocure is the trade name for N-cyclohexyl-2-benzothiazole sulfenamide.

The compounding formula for the natural rubber specimens is appended to Table III, following.

When compounds were prepared with the new antiozidants or with other antiozidants or additives, the Santoflex AW was omitted in the above recipe and the new antiozidants or other materials were used in its place.

The synthetic and natural rubber samples were cured at about 1000 p.s.i. in a steam heated press at 85° F. with curing times adjusted in the range from 30 to 120 minutes, as required to obtain optimum tensile properties for each specific compound. Samples of each of the cured stocks were heat aged for 24 to 48 hours at 100° C., and were then subjected to ozone exposures in both dynamic and static tests.

The dynamic ozone test was conducted on ½ inch dumbell specimens of the vulcanizates. The exposure to ozone was carried out in an aluminum lined ozine cabinet where the concentration of ozones was usually held at 25±5 parts per hundred million of air. This high ozone concentration is used as specified by ASTM test D-1149-51T to accentuate the protective effect of the additive antiozidants in a reasonable short time of evaluation. Occasionally more highly accelerated ozone exposure tests were conducted by employing ozone concentrations as high as 150 p.p.h.m. With such high ozone concentrations much shorter times are required to obtain valid comparisons of the protective action of the additives under test (e.g., Table I, Examples 21 to 30 inclusive). The sample was stretched and relaxed continuously at a rate of 30 times per minute, between 0 and 20% elongation, to simulate conditions of dynamic use of the rubber. After each test usually of three days duration, a specimen taken from the center part of the narrow part of the dumbell was placed under the microscope and the depth of the observed cracks was measured.

The depths of the deeper 50% of the observed cracks were averaged, and this average was designated as the "A value" and was taken as the index of ozone attack. With each experimental sample a control sample containing Santoflex AW was simultaneously subjected to the same dynamic ozone test, and the average crack depth, "A value," was compared with the "A value" for the crack depths of this control sample, as a basis of evaluation.

The static tests (Table IV) were run on both heat aged and unaged samples. Dumbell specimens were mounted in accordance with ASTM procedure D518–44, Method B. The mounted samples were placed in the ozone exposure cabinet wherein the ozone concentration was held at a concentration of 25±5 p.p.h.m. at a temperature of 40° C. In this static test the samples were observed periodically and the time was measured to the appearance of the first crack. The run was continued to obtain relative ratings on rate of crack growth and ratings were then applied on the basis of the ASTM rating system shown in Table V.

*Table V*

| Rating: | Developments in static tests |
|---|---|
| 0 | No developments of any kind. |
| 1 | Microscopic cracking. |
| 2 | Fine visible cracking. |
| 3 | Pronounced visible cracking. |
| 4 | Severe visible cracking. |

OBSERVED RESULTS

Table I lists many amino compounds, diamino compounds, polyamino compounds and derivatives thereof which showed very poor protection of vulcanized GR-S synthetic rubber against ozone attack, either before or after the GR-S vulcanizate was subjected to accelerated aging at elevated temperatures. However, they belong to one or more classes of materials known to have antioxidant properties. Because Santoflex AW is highly regarded in the industry, samples containing it were tested with each group of samples containing other amino compounds to monitor the procedure and to give assurance that the several results were valid for evaluating the relative effectiveness of the several amino compounds for protection of GR-S against ozone attack.

Ortho and meta-diamino aromatic compounds are relatively inactive as antiozidants (Table I, Examples 79, 80, 184, and 185); also certain compounds, e.g., naphthylamine and tetrahydronaphthylamine derivatives, although good antioxidants, are not good antioxidants. (See Table I, Samples 161 and 163.)

A study of Table I is sufficient to confirm that most types of amino-antioxidants are of little or no value in compounding elastomers to make ozone-resistant articles of use. Certain compounds show some protection against ozone in comparison with Santoflex AW, e.g., Examples 20 and 186, but after heat aging protection against ozone was not outstanding. It should also be called to attention that the GR-S 1500 examples herein contained from 1 to 1.25 parts of phenylbetanaphthylamine (PBNA) (present in the raw synthetic rubber) in addition to the additives shown in the tables. This PBNA is added at the industrial plants producing GR-S to protect against air oxidation during shipment and storage. It does not protect compounded and cured articles produced therefrom against ozone cracking (see Examples I-1 and I-101).

*Table I*

OZONE ATTACK ON GR-S 1500 WITH VARIOUS AMINES INCLUDED IN THE COMPOUNDING RECIPES AS DETERMINED BY DYNAMIC OZONE TEST [1]

| Example | Code number | Amine compound (pts./100 pts. elastomer) | Tens. | 300% mod. | Pecent elong. | Aged properties Tens. | Aged properties Percent elong. | Crack depth "A Value" in microns Unaged | Crack depth "A Value" in microns Heat aged |
|---|---|---|---|---|---|---|---|---|---|
| | GROUP A | | | | | | | | |
| 1 | G-3106 | Control (GR-S 1500 with no added amine) | 2,710 | 1,820 | 450 | | | 290 | Broke |
| 2 | F-94 | Santoflex AW [2] (5) (2nd Control) | 2,450 | 1,330 | 430 | | | 25 | 285 |
| 3 | G-3868 | Santoflex AW [2] (2) (3rd Control) | 2,350 | 970 | 610 | | | 220 | 525 |
| 4 | F-93 | Reaction product of 1, 4-cyclohexanedione+aniline+H₂ (5) | 2,460 | 1,640 | 450 | | | 405 | 360 |
| 5 | F-88 | Tetrahydroquinoline (2.5) | 3,320 | 1,670 | 505 | | | 415 | |
| 6 | F-86 | Piperidiniumpentamethylenedithiocarbamate (2.5) | 1,810 | | 270 | | | 240 | |
| 7 | F-81 | Bis (p-aminophenyl)-4-amino-m-tolylcarbinol (5) | 2,590 | 1,840 | 410 | 2,690 | 190 | 405 | |
| 8 | F-80 | Safranin O (5) (3,7-dimethylphenosafranine) | 2,330 | | 295 | 1,960 | 180 | 360 | |
| 9 | F-79 | Phenosafranin (5) | 3,150 | 2,430 | 385 | 2,420 | 205 | 380 | |
| | GROUP B | | | | | | | | |
| 10 | G-3868 | Santoflex AW [2] (2) (Control) | 2,350 | 970 | 610 | 2,270 | 280 | 215 | 550 |
| 11 | F-61 | Lactonitrilo-p,p'-diaminodiphenylmethane (5) | 2,730 | 2,140 | 375 | 2,350 | 185 | 275 | |
| 12 | F-58 | Phenyl-1,2,3,4-tetrahydro-2-naphthylamine (5) | 3,110 | 1,890 | 440 | 2,620 | 255 | 300 | |
| 13 | F-57 | 1,2,3,4-tetrahydro-2-naphthylamine (5) | 2,840 | 2,090 | 375 | 2,410 | 260 | 250 | |
| 14 | F-36 | Di-sec-butylphenylenediamine (2.1)+rosin acid (10.6) | 2,640 | 1,080 | 585 | 2,300 | 270 | 310 | 760 |
| 15 | F-92 | 4,4',4''-triaminotriphenylmethane (5) | 2,790 | 2,180 | 350 | | | 125 | |
| 16 | F-75 | Tetraethylthiuramdisulfide (2.5) | 2,590 | | 285 | 2,270 | 210 | 190 | |
| 17 | F-63 | 1,4-Bis(1,2,3,4-tetrahydro-2-naphthylamino) benzene (5) | 2,990 | 1,820 | 455 | 2,430 | 240 | 165 | |
| | GROUP C | | | | | | | | |
| 18 | G-3414 | Santoflex AW [2] (2) (Control) | 2,350 | 970 | 610 | 2,270 | 280 | 200 | 545 |
| 19 | F-34 | N,N'-di-sec-butyl-p-phenylenediamine (2.5)+rosin acid (6.8) | 3,300 | 1,800 | 475 | 2,870 | 245 | 250 | 610 |
| 20 | E-82 | N,N'-di-sec-butyl-p-phenylenediamine-2BF3 complex (5) | 2,940 | 1,720 | 500 | 2,910 | 250 | 0 | 335 |
| | GROUP D | | | | | | | | |
| 21 | G-2541 | Santoflex AW [2] (2) (Control) | 2,350 | 970 | 610 | 2,270 | 280 | 430 | |
| 22 | C-39 | Tri-n-butylamine (5) | 3,250 | 1,950 | 465 | 2,120 | 175 | 525 | |
| 23 | C-44 | p-Aminobenzoic acid (5) | 3,020 | 1,760 | 490 | 2,330 | 170 | 765 | |
| 24 | C-49 | Diazoaminobenzene (5) | 3,340 | 3,100 | 320 | 2,530 | 180 | 740 | |
| 25 | C-50 | p,p-Tetramethyldiaminodiphenylmethane (5) | 3,420 | 1,770 | 485 | 2,570 | 225 | 395 | |
| 26 | C-40 | 2,4,6-tris (dimethylaminomethyl) phenol (5) | 3,490 | 1,880 | 490 | 2,290 | 170 | 520 | |
| 27 | C-31 | Rosinamine D (25) | 1,840 | 1,070 | 415 | | | 420 | |

See footnotes at end of table.

Table I—Continued

| Example | Code number | Amine compound (pts./100 pts. elastomer) | Tens. | 300% mod. | Percent elong. | Aged properties Tens. | Aged properties Percent elong. | Crack depth "A Value" in microns Un-aged | Crack depth "A Value" in microns Heat aged |
|---|---|---|---|---|---|---|---|---|---|
| | | GROUP E | | | | | | | |
| 28 | G-2541 | Santoflex AW (2) | 2,350 | 970 | 610 | 2,270 | 280 | 405 | |
| 29 | C-57 | N,N'-diphenyl-p-phenylenediamine (5) | 3,510 | 2,350 | 420 | 2,940 | 235 | 400 | |
| 30 | C-52 | p,p'-Diaminodiphenylmethane (5) | 3,200 | 2,370 | 395 | 1,630 | 70 | 350 | |
| | | GROUP F | | | | | | | |
| 31 | G-2541 | Santoflex AW [2] (2) (Control) | 2,350 | 970 | 610 | 2,270 | 280 | 185 | 500 |
| 32 | C-78 | N,N'-di-sec-butyl-p-phenylenediamine (2) | 3,480 | 2,290 | 435 | 2,640 | 195 | 100 | 410 |
| 33 | C-53 | Benzidine (5) | 3,010 | 2,550 | 365 | 2,150 | 110 | 80 | 100 |
| 34 | C-79 | N,N'-di-sec-butyl-p-phenylenediamine (2) Castor oil (12.5) +Dresinate 731 acids (12.5). | 3,080 | 2,110 | 405 | 2,220 | 160 | 100 | |
| | | GROUP G | | | | | | | |
| 35 | G-2621 | Santoflex AW[2] (2) (Control) | 2,700 | 1,500 | 510 | | | 160 | |
| 36 | D-2 | Benzidine (2)+Rosin (6,5) | 3,500 | 2,290 | 455 | 1,860 | 75 | 95 | |
| 37 | D-29 | Quinoline (5) | 3,070 | 2,820 | 325 | 2,050 | 145 | 165 | |
| 38 | D-86 | p,p'-Bis(2,5-dimethylpyrrolidinyl)biphenyl (5) | 3,380 | 2,340 | 415 | 2,100 | 115 | 175 | |
| 39 | D-87 | N,N'-di-(1-phenylethyl)benzidine (5) | 3,380 | 2,050 | 465 | 2,760 | 200 | 160 | |
| | | GROUP H | | | | | | | |
| 40 | G-2989 | Santoflex AW (2) (Control) | 2,350 | 970 | 610 | 2,270 | 280 | 100 | |
| 41 | D-51 | 1,2,3-triphenylguanidine (5) | 3,290 | 2,550 | 375 | 2,170 | 170 | 120 | |
| 42 | D-58 | n-Butyl-p-aminophenol (5) | 2,610 | 1,040 | 650 | 2,460 | 260 | 150 | |
| 43 | H-29 | Mono-oleic amide of p-phenylene-diamine (5) | 2,800 | 1,370 | 530 | | | 230 | |
| 44 | H-21 | Uns-N,N-dicyclohexyl-p-phenylene-diamine (5) | 2,740 | 2,040 | 425 | | | 125 | |
| | | GROUP I | | | | | | | |
| 45 | G-3414-2 | Santoflex AW (2) (Control) | 2,350 | 970 | 610 | 2,270 | 280 | 260 | |
| 46 | E-45 | Alkylamine JM-R (5) | 2,970 | 2,180 | 370 | 2,040 | 175 | 260 | |
| 47 | E-51 | Benzidine (solubilized) (2,5) | 2,930 | 2,250 | 375 | 1,640 | 100 | 160 | |
| 48 | E-61 | Dicyclohexylammonium nitrite (5) | 2,940 | 2,560 | 345 | 2,560 | 185 | 260 | |
| | | GROUP J | | | | | | | |
| 49 | G-3414-2 | Santoflex AW [2] (2) (Control) | 2,350 | 970 | 610 | 2,270 | 280 | 130 | |
| 50 | E-89 | Phenothiazine (5) | 3,110 | 2,070 | 435 | 2,390 | 170 | 110 | |
| | | GROUP K | | | | | | | |
| 51 | G-3414 | Santoflex AW [2] (2) (Control) | 2,350 | 970 | 610 | 2,270 | 280 | | 510 |
| 52 | PS-1 | N,N'-di-sec-butyl-p-phenylenediamine (3)+PBNA [3] (3) | 2,600 | 1,970 | 410 | | | | 290 |
| 53 | PS-2 | N,N'-di-sec-butyl-p-phenylenediamine (4.65)+PBNA [3] (1.25). | 2,560 | 1,610 | 450 | | | | 300 |
| | | GROUP L | | | | | | | |
| 54 | G-3414 | Santoflex AW [2] (2) (Control) | 2,350 | 970 | 610 | 2,270 | 280 | 115 | 500 |
| 55 | F-25 | Reaction product of N,N'-di-sec-butyl-p-phenylenediamine and lactonitrile (1:1 mole ratio) (5). | 3,070 | 1,120 | 595 | 2,650 | 310 | 20 | 310 |
| 56 | F-26 | Reaction product of N,N'-di-sec-butyl-p-phenylenediamine and lactonitrile (2) and tetraethylenepentamine mole ratio (1:2:1) (3). | 3,000 | 1,460 | 545 | 2,980 | 285 | 0 | 320 |
| 57 | E-33 | Mono-oxalate of N-N'-di-sec-butyl-phenylenediamine (5) | 3,250 | 1,950 | 475 | 2,720 | 215 | 0 | 380 |
| | | GROUP M | | | | | | | |
| 58 | G-2541 | Santoflex AW [2] (2) (Control) | 2,350 | 970 | 610 | 2,270 | 280 | 400 | |
| 59 | C-41 | 1-naphthylamine-4,8-disulfonic acid (sodium salt) (5) | 3,280 | 2,010 | 485 | 2,530 | 185 | 735 | |
| 60 | C-42 | 2-naphthylamine-4,8-disulfonic acid (5) | 3,110 | 2,010 | 485 | 2,530 | 185 | 735 | |
| 61 | C-43 | 2-naphthylamine-1-sulfonic acid (sodium salt) (5) | 3,420 | 2,530 | 405 | 2,310 | 170 | 715 | |
| 62 | C-46 | Dimethylaminomethylphenol (5) | 3,350 | 1,840 | 475 | 2,340 | 165 | 675 | |
| 63 | C-47 | o-Dimethylaminoethyl-p-butyl-phenol (5) | 3,540 | 2,150 | 435 | 2,530 | 160 | 745 | |
| 64 | C-48 | o-Dimethylaminoethyl-p-octyl-phenol (5) | 3,630 | 2,050 | 455 | 2,370 | 175 | >500 | |
| 65 | C-54 | 4,4'-diamino-2,2'-biphenyl-disulfonic acid (3.5) | 3,460 | 1,780 | 510 | 2,840 | 235 | 615 | |
| 66 | C-55 | p,p'-Tetramethyldiaminobenzophenone (5) | 3,680 | 1,840 | 490 | 2,930 | 275 | 585 | |
| 67 | C-56 | p,p'-Diaminodiphenylamine (2) sulfonic acid | 3,510 | 2,350 | 420 | 2,940 | 235 | 655 | |
| | | GROUP N | | | | | | | |
| 68 | G-2541 | Santoflex AW [2] (2) (Control) | 2,350 | 1,950 | 475 | 2,720 | 215 | 205 | |
| 69 | AEN | Octadecylamine(5)+montmorillonite (13) | 2,840 | 1,240 | 525 | 2,400 | 245 | 495 | |
| 70 | AEO | Dimethyldioctadecylammonium montmorillonite (9) | 2,940 | 2,460 | 355 | 2,400 | 185 | 390 | |
| 71 | AER | Rosinamine D (5)+kaolin (13) | 2,970 | 1,360 | 505 | 2,670 | 305 | 345 | |
| 72 | AES | Rosinamine D (5)+montmorillonite (13) | 3,260 | 1,260 | 560 | 2,520 | 290 | 265 | |
| | | GROUP O | | | | | | | |
| 73 | G-2541 | Santoflex AW [2] (2) (Control) | 2,350 | 970 | 610 | 2,270 | 280 | 200 | |
| 74 | C-51 | p-aminoazobenzene (5) | 3,190 | 2,340 | 395 | 2,900 | 210 | 345 | |
| 75 | C-77 | N,N'-di-sec-butyl-p-phenylenediamine (2) | 2,990 | 1,890 | 435 | 2,370 | 150 | 435 | |
| 76 | D-8 | 2,4,6-triaminotoluene (2) | 2,810 | 1,670 | 455 | 2,340 | 120 | 450 | |
| 77 | D-9 | 1,3,5-triaminobenzene (2) | 3,110 | 1,930 | 440 | 1,550 | 65 | 420 | |
| 78 | D-10 | Phloramine sulfate (2) | 2,500 | 1,310 | 505 | 1,680 | 75 | 420 | |
| 79 | D-12 | m-Phenylenediamine(1)+rosin (5,6) | 2,990 | 1,840 | 445 | 2,070 | 100 | 370 | |
| 80 | D-13 | o-Phenylenediamine(1)+rosin (5,6) | 3,090 | 1,650 | 485 | 2,190 | 130 | 330 | |
| 81 | D-14 | p-Phenylenediamine(1)+rosin (5,6) | 2,690 | 2,380 | 335 | 1,510 | 85 | 290 | |
| 82 | D-18 | N-nitrosodiphenylamine (5) | 2,490 | 1,060 | 615 | 2,390 | 150 | 290 | |
| 83 | III-60 | N,N'-di-sec-butyl-p-phenylenediamine (2.85) and montmorillonite (26). | 1,130 | 310 | 875 | 1,800 | 245 | 380 | |
| 84 | III-61 | Benzidine (2,4) and montmorillonite (26) | 1,250 | 490 | 705 | 1,905 | 205 | 390 | |
| 85 | D-23 | Phenylbiguanide (5) | 2,210 | 1,800 | 365 | 2,230 | 230 | 300 | |

See footnotes at end of table.

Table I—Continued

| Example | Code number | Amine compound (pts./100 pts. elastomer) | Tens. | 300% mod. | Percent elong. | Aged properties Tens. | Aged properties Percent elong. | Crack depth "A Value" in microns Un-aged | Crack depth "A Value" in microns Heat aged |
|---|---|---|---|---|---|---|---|---|---|
| | GROUP Q | | | | | | | | |
| 86 | G-2989 | Santoflex AW² (2) (Control) | 2,350 | 970 | 610 | 2,270 | 280 | 175 | |
| 87 | D-26 | 2,6-diaminopyridine (5) | 1,580 | 650 | 610 | 2,050 | 365 | 410 | |
| 88 | D-27 | 2-aminopyridine (5) | 2,730 | 2,440 | 325 | 2,350 | 185 | 345 | |
| | GROUP R | | | | | | | | |
| 89 | G-2989 | Santoflex AW² (2) (Control) | 2,350 | 970 | 610 | 2,270 | 280 | 270 | |
| 90 | D-28 | Quinaldine (3) | 2,940 | 2,230 | 390 | 2,300 | 165 | 360 | |
| 91 | D-37 | Phenyl-beta-naphthylamine (1) | 3,100 | 2,120 | 365 | 1,960 | 155 | 340 | |
| | GROUP S | | | | | | | | |
| 92 | G-2989-1 | Santoflex AW² (2) (Control) | 2,320 | 9,990 | 595 | 2,270 | 280 | 120 | |
| 93 | D-44 | Diacetylbenzidine (5) | 3,380 | 1,860 | 465 | 2,750 | 180 | 360 | |
| 94 | D-45 | Substituted dihydrazide of adipic acid (2) | 3,550 | 2,320 | 425 | 2,560 | 185 | 280 | |
| 95 | D-46 | Substituted pyrazolinylazine (2) | 3,560 | 2,010 | 475 | 2,440 | 195 | 230 | |
| | GROUP T | | | | | | | | |
| 96 | G-2989-2 | Santoflex AW² (2) (Control) | 2,320 | 990 | 595 | 2,270 | 280 | 170 | |
| 97 | D-74 | Crude p,p'-bis(dimethylpyrrolidinyl)biphenyl (5) | 3,350 | 2,050 | 465 | 2,450 | 165 | 135 | |
| 98 | D-83 | Flectol H⁴ (5) | 3,210 | 2,140 | 435 | 1,830 | 145 | 135 | |
| 99 | D-85 | Santoflex B⁵ (5) | 3,470 | 2,120 | 460 | 2,740 | 215 | 155 | |
| | GROUP U | | | | | | | | |
| 100 | G-2989 | Santoflex AW² (2) (Contol) | 2,350 | 970 | 610 | 2,270 | 280 | 135 | |
| 101 | G-3106 | No additive (Control) | 2,710 | 1,820 | 450 | | | 290 | |
| 102 | D-88 | p-Bis(2,5'-dimethylpyrrolidinyl)benzene (5) | 3,360 | 2,310 | 425 | 2,040 | 130 | 170 | |
| 103 | D-90 | 3-methyl-5-phenyl-pyrazoline (5) | 3,390 | 2,020 | 455 | 2,180 | 165 | 240 | |
| 104 | D-89 | m-Amino-sec-butylaniline (5) | 2,030 | 700 | 775 | 2,900 | 285 | 175 | |
| | GROUP V | | | | | | | | |
| 105 | G-2989 | Santoflex AW² (2) (Control) | 2,350 | 790 | 610 | 2,270 | 280 | 100 | |
| 106 | D-48 | Hydrobenzamide (5) | 2,070 | | 260 | 1,720 | 150 | 415 | |
| 107 | D-49 | Auramine hydrochloride (5) | 2,910 | 2,700 | 325 | 2,300 | 155 | 205 | |
| 108 | D-52 | 2-anilino-1,4-diphenyl-5-phenylimino-1,2,4-triazoline (5) | 3,330 | 2,440 | 395 | 2,690 | 180 | 230 | |
| 109 | D-53 | Tetrahydrophthalimide (5) | 2,760 | 2,220 | 360 | 1,700 | 105 | 210 | |
| 110 | D-54 | 2,4-diaminotoluene (5) | 2,590 | 990 | 660 | 1,840 | 165 | 225 | |
| 111 | D-55 | Isatin (5) | 2,820 | 1,410 | 553 | 2,570 | 260 | 400 | |
| 112 | D-56 | 4-aminoantipyrine (5) | 2,770 | 1,780 | 435 | 2,430 | 285 | 225 | |
| 113 | D-57 | 4,4'-diaminodiphenyl sulfone (2.5) | 3,240 | 2,030 | 450 | 2,420 | 175 | 360 | |
| 114 | D-59 | Rosaniline hydrochloride (5) | 2,800 | 2,050 | 380 | 1,940 | 135 | 265 | |
| 115 | D-60 | Polyamide resin 94 (10) | 2,570 | 1,530 | 465 | 2,110 | 240 | 260 | |
| 116 | D-65 | Aurin (5) | 2,870 | 1,910 | 420 | 2,340 | 175 | 320 | |
| | GROUP W | | | | | | | | |
| 117 | G-2989 | Santoflex AW (2) (Control) | 2,350 | 970 | 610 | 2,270 | 280 | 110 | |
| 118 | D-98 | Nicotinic acid (5) | 2,700 | 2,010 | 385 | | | 280 | |
| 119 | D-69 | Polyvinylpyridine (10) | 2,550 | 2,200 | 335 | 2,070 | 175 | 235 | |
| 120 | D-70 | p-Diazodiphenylamine sulfate (2) | 3,390 | 2,350 | 415 | 2,470 | 165 | 270 | |
| 121 | D-71 | Benzidine-2,2'-disulfonic acid (2) | 2,570 | 2,130 | 355 | 1,930 | 145 | 255 | |
| 122 | E-2 | Citriazinic acid solubilized in tri-methylbenzyl ammonium hydroxide (2.5). | 3,350 | 2,330 | 450 | | | 260 | |
| 123 | E-5 | Citrazinic acid (2.5) | 3,200 | 1,860 | 510 | | | 365 | |
| 124 | E-8 | Diphenylamine (5) | 3,140 | 2,230 | 405 | 2,560 | 160 | 380 | |
| 125 | E-9 | Azoxybenzene (5) | 3,110 | 2,370 | 385 | 2,430 | 155 | 290 | |
| | GROUP X | | | | | | | | |
| 126 | G-2989-2 | Santoflex AW² (2) (Control) | 2,350 | 970 | 610 | 2,270 | 280 | 130 | |
| 127 | E-12 | Reaction product of lactonitrile and furfurylamine (5) | 2,710 | 1,020 | 630 | 2,230 | 290 | 335 | |
| 128 | E-13 | Reaction product of lactonitrile and 12-15 carbine amine (5) | 2,920 | 1,620 | 465 | 2,440 | 235 | 395 | |
| 129 | E-14 | Reaction product of lactonitrile and 18-24 carbon amine (5) | 3,120 | 1,800 | 455 | 2,810 | 255 | 320 | |
| 130 | E-15 | Tris(hydrozymethyl)aminomethane (5) | 2,830 | 2,070 | 375 | 2,070 | 220 | >400 | |
| 131 | E-16 | 2-aminobenzmethiol (5) | 3,180 | 1,760 | 525 | 2,050 | 110 | 280 | |
| 132 | E-17 | Phenylhydrazine (5) | 2,300 | 1,140 | 485 | 2,100 | 245 | 395 | |
| 133 | E-18 | 5,5-dimethyl-hydantoin (5) | 2,950 | 1,930 | 425 | 1,950 | 155 | 340 | |
| 134 | E-19 | Dimethyl-p,p'-azodibenzoate (5) | 3,050 | 2,440 | 375 | 2,290 | 165 | 415 | |
| 135 | E-20 | 4-amino-2,6-dimethylpyrimidine (5) | 2,630 | | 285 | 1,610 | 130 | 385 | |
| 136 | E-21 | Hydrazobenzene (5) | 2,840 | 2,480 | 335 | 2,680 | 205 | 445 | |
| | GROUP Y | | | | | | | | |
| 137 | G-2989-1 | Santoflex AW²(2) (Control) | 2,350 | 970 | 610 | 2,270 | 280 | 150 | |
| 138 | B-584A | Benzidine (2.5) | 3,000 | 1,200 | 600 | 2,280 | 280 | 180 | |
| 139 | B-4471 | No additive | 3,000 | 1,200 | 570 | | | 360 | |
| 140 | E-22 | 2,2'-diethyldihexylamine (5) | 1,380 | | 210 | 1,160 | 110 | 290 | |
| 141 | E-24 | 2-pyrrolidone (5) | 2,970 | 2,770 | 325 | 2,540 | 190 | 295 | |
| 142 | E-25 | N-vinyl-2-pyrrolidone (5) | 3,050 | 2,240 | 400 | 2,630 | 215 | 260 | |
| | GROUP Z | | | | | | | | |
| 143 | G-3414-1 | Santoflex AW (2) (Control) | 2,350 | 970 | 610 | 2,270 | 280 | 220 | |
| 144 | E-27 | Reaction product of benzidine and lactonitrile (1:1) (5) | 2,800 | 1,990 | 435 | 2,320 | 190 | 405 | |
| 145 | E-28 | Reaction product of p-phenylenediamine and lactonitrile (1:2) (5). | 1,900 | 1,080 | 480 | 2,110 | 275 | 575 | |
| 146 | E-29 | Reaction product of p-phenylenediamine and lactonitrile (1:1) (5). | 2,730 | 1,630 | 465 | 1,900 | 195 | 460 | |
| 147 | E-30 | Alpha-isopropylaminopropionitrile (5) | 3,000 | 2,270 | 385 | 2,200 | 182 | 410 | |
| 148 | E-32 | p-aminodiphenyl (5) | 3,300 | 2,180 | 440 | 2,730 | 205 | 230 | |

See footnotes at end of table.

*Table I—Continued*

| Example | Code number | Amine compound (pts./100 pts. elastomer) | Tens. | 300% mod. | Percent elong. | Aged properties Tens. | Aged properties Percent elong. | Crack depth "A Value" in microns Un-aged | Crack depth "A Value" in microns Heat aged |
|---|---|---|---|---|---|---|---|---|---|
| | GROUP AA | | | | | | | | |
| 149 | G-3414 | Santoflex AW[2] (2) (Control) | 2,350 | 970 | 610 | 2,270 | 280 | 155 | |
| 150 | E-34 | Benzidine mono-oxalate (5) | 3,170 | 2,030 | 435 | 2,290 | 145 | 395 | |
| 151 | E-36 | Pyridine-boronfluoride complex (5) | 3,130 | 1,600 | 527 | 2,620 | 190 | 400 | |
| 152 | E-41 | 2-aminothiazole (5) | 2,520 | 1,920 | 375 | 2,460 | 200 | 305 | |
| 153 | E-46 | Reaction product of benzidine and crotonaldehyde (1:1) (2.5) | 2,870 | 2,490 | 340 | 1,890 | 140 | 250 | |
| 154 | E-47 | 1 cyclohexylamino-2-propanol (5) | 2,920 | 1,960 | 405 | 2,530 | 250 | 205 | |
| 155 | E-37 | Reaction product of lactonitrile and m-Phenylenediamine (1:1) (5). | 2,680 | 1,230 | 590 | 2,710 | 275 | 345 | |
| 156 | E-38 | Reaction product of lactonitrile and m-Phenylenediamine (2:1) (5). | 1,420 | 490 | 665 | 2,320 | 435 | 565 | |
| 157 | E-40 | 2-aminobenzothiazole (5) | 3,000 | 2,040 | 410 | 2,400 | 200 | 290 | |
| | GROUP AB | | | | | | | | |
| 158 | G-3414 | Santoflex AW[2] (2) (Control) | 2,350 | 970 | 610 | 2,270 | 290 | 205 | |
| 159 | E-52 | Polymethacrylamide (5) | 2,990 | 1,680 | 475 | 1,750 | 155 | 460 | |
| 160 | E-53 | Urea (5) | 2,600 | | 245 | 2,220 | 120 | Broke | |
| 161 | E-63 | Naphthylamine (5) | 3,000 | 950 | 635 | 2,360 | 270 | 265 | |
| 162 | E-64 | 1,3-diphenyltriazene (5) | 3,150 | 1,420 | 525 | 2,740 | 310 | 395 | |
| 163 | E-65 | N,N'-diphenylethylenediamine (5) | 2,810 | 980 | 605 | 2,170 | 260 | 225 | |
| | GROUP AC | | | | | | | | |
| 164 | G-3414-2 | Santoflex AW[2] (2) (Control) | 2,350 | 970 | 610 | 2,270 | 290 | 195 | |
| 165 | E-70 | Polyester of dilinoleic acid and ethyleneglycol (10) benzidine (1.25). | 2,510 | 1,060 | 540 | 1,810 | 180 | 300 | |
| 166 | E-75 | Reaction product of tetraethylene pentamine and lactonitrile (1:1) (5). | 1,610 | 420 | 865 | 1,950 | 445 | 535 | |
| | GROUP AD | | | | | | | | |
| 167 | G-3414-2 | Santoflex AW[2] (2) (Control) | 2,350 | 970 | 610 | 2,270 | 280 | 145 | |
| 168 | E-54 | Hexamethylenediamine (5) | 2,030 | 750 | 625 | 2,100 | 285 | 435 | |
| 169 | E-80 | Reaction product of lactonitrile and cyclohexylamine (5) | 2,430 | 900 | 625 | 2,110 | 295 | 295 | |
| 170 | E-81 | Benzidine-BF₃ complex (5) | 2,140 | 1,640 | 375 | 1,270 | 110 | 265 | |
| 171 | E-84 | Reilly Tar 819(2.5) alkylamine JM-R (2.5) | 3,020 | 2,020 | 420 | 2,620 | 235 | 180 | |
| 172 | E-83 | Hydrofuramide (5) | 2,850 | 1,790 | 435 | 2,770 | 280 | 195 | |
| 173 | E-90 | N-phenyl-1-naphthylamine (5) | 2,130 | 1,650 | 520 | 2,590 | 215 | 390 | |
| 174 | H-7 | N,N'-bis(2-hydroxypropyl)-p-phenylenediamine (5) | 3,260 | 1,250 | 625 | | | 285 | |
| | GROUP AE | | | | | | | | |
| 175 | G-3414-2 | Santoflex AW[2] (2) (Control) | 2,350 | 970 | 610 | 2,270 | 280 | 210 | 500 |
| 176 | G-3694 | Phenyl-beta-naphthylamine (1) | 3,430 | 1,750 | 520 | | | 520 | Broke |
| 177 | E-91 | Carbazole (5) | 3,330 | 1,900 | 495 | 2,700 | 220 | 460 | |
| 178 | E-95 | Aminoacetanilide (5) | 2,920 | 2,120 | 400 | 2,550 | 235 | 270 | |
| 179 | E-96 | Tetraphenylhydrazine (5) | 3,260 | 1,730 | 520 | 2,480 | 190 | 460 | |
| 180 | F-28 | Duomeen S (5) | 2,650 | 1,530 | 430 | 2,270 | 240 | 420 | |
| 181 | F-37 | Sym-di-beta-naphthyl-p-phenylenediamine (5) | 3,330 | 2,070 | 465 | 2,620 | 195 | 275 | |
| 182 | F-40 | N,N'-di(1-phenylethyl)benzidine (2.5) | 3,140 | 1,690 | 515 | 2,920 | 235 | 320 | |
| 183 | F-41 | p,p'-Diaminodiphenylmethane (2.5) | 3,040 | 2,240 | 410 | 2,060 | 140 | 330 | |
| 184 | H-26 | o-Phenylenediamine (5) | 3,000 | 2,100 | 400 | 2,200 | 200 | 115 | 500 |
| 185 | H-27 | m-Phenylenediamine (5) | 2,900 | 2,100 | 410 | 2,500 | 210 | 340 | 600 |
| 186 | H-28 | p-Phenylenediamine (5) | 3,000 | 2,200 | 415 | 2,400 | 190 | 40 | 400 |
| 187 | S-1 | N,N'-bis(methylhexadecyl)phenylenediamine (5) | 3,200 | 2,200 | 400 | | | 250 | |
| 188 | G-95 | N,N'-dibenzyl-p-phenylenediamine (5) | 2,540 | 950 | 555 | | | 180 | |

[1] The ozone exposure test was conducted at 40° C. with the samples being flexed 30 times per minute from 0 to 20% elongation. With each group of compounds a control sample was included to serve as a monitor for the group. The ozone concentration and times of exposure were regulated so as to obtain easily measured ozone cracking for comparative purposes for each group of samples.
[2] Santoflex AW is 6-ethoxy-2,2,3-trimethyl-1,2-dihydroquinoline.
[3] PBNA denotes phenyl-beta-naphthylamine.
[4] Flectol H is the condensation product of acetone and aniline.
[5] Santoflex B is the condensation product of acetone and p-aminodiphenyl.

Table II tabulates the tensile properties, hours exposure, conditions of test and depth of ozone cracks under dynamic test, for the controls, for compounds including the new antiozidants of the present invention, and for other additives tested for comparative effectiveness.

It was noted that when at least one of the N-radical substituents of p-phenylenediamine are secondary alkyl groups the antiozidant activity is more effective than when such radicals are primary alkyl groups as exemplified by samples 5 and 6 of Table II. Also when such radicals are lower alkyl groups as in Example 3 of Table II ozone protection is not afforded in dynamic tests of heat aged elastomer compounds, in spite of the fact that such compounds are good antioxidants.

In comparative studies a few specific compositions of matter were discovered jointly by the applicant and R. G. Spain, which new compositions were more effective than Santoflex AW, and are represented by the formula R—HN—A—NHR', in which A is p,p'-biphenylene or methylenediphenylene, and one or both of R and R' are alkyl groups containing 8 to 13 carbons, e.g., samples 9 and 11 of Table II.

Data for specimens prepared from "hot" GR-S (GR-S 1002) were very similar to those for "cold" GR-S set forth in Table II and have therefrom been omitted for the sake of brevity.

Table III illustrates the effectiveness of the new antiozidants in producing an ozone resistant natural rubber product. The compounding recipe is appended in this table, and it will be noted that PBNA was included in the compounding recipe to render the results directly comparable with those obtained with GR-S.

The ozone cracking in the case of the controls was in excess of the 50 microns "A value" which represents virtual immunity to ozone attack, while the natural rubber compounded with the new antioxidant of this invention was well under that permissible "A value."

respect to static elastomer samples; the tests being made on GR-S 1500 as well as on other elastomers not customarily used for tires or other articles which are subjected to dynamic stressing. In these tests the ozone

Table II

COMPOUNDS OF GR-S 1500 SYNTHETIC RUBBER; AGED 24 HRS. AT 100° C OZONE EXPOSURE: 25±5 P.P.H.M. 40° C

| Sample | Additive: pts./100 pts. | Tensile properties | | | | Ozone exposure | |
| | | Unaged | | Aged | | | "A Value" crack depth (microns) |
| | | Tens., p.s.i. | Elong., Percent | Tens., p.s.i. | Elong., Percent | Hrs. | |
|---|---|---|---|---|---|---|---|
| 1 | Control with 2 pts. Santoflex AW | 2,350 | 610 | 2,270 | 280 | 70 | 455 |
| 2 | Control with 5 pts. Santoflex AW | 2,450 | 430 | 2,300 | 200 | 70 | 300 |
| 3 | N,N'-di-sec-butyl-p-phenylenediamine [1] 5 pts | 3,130 | 475 | 2,300 | 245 | 70 | 500 |
| 4 | N,N'-di-sec-nonyl-p-phenylenediamine [2] 5 pts | 2,830 | 485 | 2,670 | 260 | 70 | 10 |
| 5 | N,N'-di-sec-octyl-p-phenylenediamine [3] 5 pts | 3,160 | 480 | 2,720 | 270 | 70 | 0 |
| 6 | N,N'-di-2-ethylhexyl-p-phenylenediamine [4], 5 pts. (Notes A and B) | 3,180 | 565 | 2,890 | 320 | 70 | 230 |
| 7 | N,N'-di-sec-dodecyl-p-phenylenediamine [5], 5 pts | 3,270 | 515 | 2,750 | 290 | 70 | 0 |
| 8 | N,N'-di-sec-undecyl-p-phenylenediamine [6], 5 pts | 3,090 | 545 | 2,630 | 245 | 70 | 30 |
| 9 | N,N'-di-sec-octyl-p,p'-diaminodiphenylmethane, 5 pts. (see Note B) | 2,500 | 470 | 2,400 | 255 | 70 | 100 |
| 10 | N,N'-di-sec-tridecyl-p-phenylenediamine [7], 5 pts | 3,310 | 455 | 2,800 | 250 | 70 | 35 |
| 11 | N-sec-octylbenzidine, 5 pts. (see Note B) | 3,010 | 455 | 2,480 | 205 | 70 | 60 |
| 12 | N,N'-di(3,5,5-trimethylcyclohexyl)-p-phenylenediamine [8], 5 pts | 2,960 | 720 | | | 70 | 100 |

[1] Tenamene II (Tennessee Eastman Corporation trade mark).
[2] U.O.P. Sample No. 2008-94 (Universal Oil Products sample)*
[3] U.O.P. Sample No. 2170-299 (Universal Oil Products sample)*
[4] U.O.P. Sample No. 2302-241 (Universal Oil Products sample)*
[5] U.O.P. Sample No. 2302-245 (Universal Oil Products sample)*
[6] U.O.P. Sample No. 2302-198 (Universal Oil Products sample)*
[7] U.O.P. Sample No. 2302-229 (Universal Oil Products sample)*
[8] Tennessee Eastman Chemical Products, Inc.*
* Samples prepared at applicant's request and identity confirmed by elemental analyses.

NOTE A.—The octyl groups in the additive in Sample 6 are primary alkyl groups.
NOTE B.—The additive of Sample 6 is a new compound prepared and investigated by the applicant herein, and those of Samples 9 and 11 are new compounds discovered and investigated jointly by applicant with R. G. Spain; each of which of these compounds appears superior to Santoflex AW for protection against ozone. They are not as effective for protection against ozone as the di-alkyl substituted p-phenylenediamine of which at least one alkyl is secondary, and in which the two alkyl radicals between them contains from 16 to 26 carbon atoms.

Table III

DYNAMIC OZONE TEST

[Compounded natural rubber [1]; ozone exposure: 25±5 p.p.h.m. @40° C; 72 hours]

| Sample | Additive: pts./100 natural rubber | Crack depth "A Value" (microns) |
|---|---|---|
| 1 (Control) | Compounded [1] without additive | 125 |
| 2 (Control) | Compounded [1] with 5 pts. Santoflex AW/100 | 80 |
| 3 | N,N'-di-sec-octyl-p-phenylenediamine (5 pts./100) | 20 |

[1] Compounding Formula:
  Natural rubber ------ 100
  Zinc stearate ------ 5
  Altax (benzothiazyl disulfide) ------ 1
  Sulfur ------ 2.5
  Philblack "0" ------ 50
  Circo light oil (Plasticizer) ------ 2.5
  Para Flux 2016 (Plasticizer) ------ 2.5
  Phenyl-beta-naphthylamine ------ 1
  Sunoco Anti Chek Wax ------ 0.5

Table IV shows the effectiveness of ozone protection afforded by antiozidants of the present invention with resistance is measured by the number of hours of ozone exposure required to produce microscopic cracking (ASTM rating 1) and the number of hours' exposure required to produce severe visible cracking (ASTM rating 4).

A simple comparison with the control containing Santoflex AW as normally used, shows the outstanding superiority of the new antiozidants.

Similarly, comparison of the protected and unprotected Hycar, Philprene and BS/S/AA (butadiene/styrene/acrylic acid terpolymer) further demonstrates the extreme effectiveness of the new antiozidants.

Examples IV-14 is which the total carbon atoms of the two alkyl substituents on the p-phenylenediamine exceeds 26, and in which the results were not even equal to those with the Santoflex AW control, further demonstrates the critical nature of the number of carton atoms in these substituents in which the sum total of carbon atoms must lie within the range of 16 to 26.

From the table it will be noted that the addition of from 1 to 5 parts of the new antiozidant increases the time preceding appearance of the first ozone cracks in static samples, as much as thirty-fold over the time of appearance of first cracks in synthetic rubber articles which have been prepared according to the best manner available prior to the discovery of the new antiozidants set forth herein (see Table IV).

Table IV

COMPUNDS AF SYNTHETIC ELASTOMERS
STATIC OZONE TEST; 25±5 P.P.H.M. OZONE; 40° C

| Sample | Elastomer | Additive: pts. per hundred elastomer | Unaged | | Aged | |
|---|---|---|---|---|---|---|
| | | | Hr. at 0 rating | Hrs. at 4 rating | Hrs. at 0 rating | Hrs. at 4 rating |
| 1 | GR-S 1500 | Control with Santoflex AW, 2 pts | 5 | 67 | 1 | 63 |
| 2 | GR-S 1500 | N,N'-di-sec-nonyl-p-phenylenediamine, 5 pts | 2,400 | [1] 2,400 | 2,400 | [1] >2,400 |
| 3 | GR-S 1500 | N,N'-di-sec-octyl-p-phenylenediamine, 5 pts | 2,400 | [1] 2,400 | 2,400 | [1] >2,400 |
| 4 | GR-S 1500 | N,N'-di-sec-dodecyl-p-phenylenediamine, 5 pts | 2,000 | [1] 2,000 | 2,000 | [1] >2,000 |
| 5 | GR-S 1500 | N,N'-di-sec-undecyl-p-phenylenediamine, 5 pts | 2,000 | [1] 2,000 | 2,000 | [1] >2,000 |
| 6 | GR-S 1500 | N,N'-di-sec-octyl-p,p'-diaminodiphenylene-methane, 5 pts. (Note A). | 1,000 | [1] 1,000 | 1,000 | [1] >1,000 |
| 7 | GR-S 1500 | N,N'-di-sec-tridecyl-p-phenylenediamine, 5 pts | 1,000 | [1] 1,000 | [2] >1,000 | >1,000 |
| 8 | GR-S 1500 | N-sec-octylbenzidine, 5 pts. (see Note A) | 1,000 | [1] 1,000 | 1,000 | >1,000 |
| 9 | Hycar[3] | No additive—Control | 5 | 15 | | |
| 10 | Hycar | N,N'-di-sec-nonyl-p-phenylenediamine, 5 pts | 754 | 2,100 | | |
| 11 | Philprene[4] | No additive—Control | 5 | 270 | 1 | 267 |
| 12 | Philprene | N,N'-di-sec-nonyl-p-phenylenediamine, 2.5 pts | 8 | 1,000 | | |
| 13 | BD/S/AA[5] | N,N'-di-sec-octyl-p-phenylenediamine, 3.5 pts | 2,000 | [1] >2,000 | 2,000 | [1] >2,000 |
| 14 | GR-S 1500 | N,N'-di-sec-heptadecyl-p-phenylenediamine, 3 pts | 3 | 24 | 2 | 12 |

[1] 4 Rating not reached in time of test.
[2] 1 rating not reached in time of test.
[3] Hycar is a butadiene/acrylonitrile elastomer (18% acrylonitrile)
[4] Philprene is a butadiene/methylvinylpyridine elastomer (85/15 weight ratio).
[5] BD/S/AA is a terpolymer comprising, by weight 75 pts. butadiene/23 pts. styrene/2 pts. acrylic acid.

NOTE A.—The additive of Sample 6 and of Sample 8 are new compounds discovered and investigated jointly by applicant with R. G. Spain.

FURTHER DISCUSSION

As above noted it has been found that when the N,N-hydrocarbon substituents on the p-phenylenediamine contain less than 16 or more than 26 carbon atoms the virtual immunization against ozone is not obtained (Examples II-3 and IV-14). It is applicant's hypothesis that migration of the antioxidant is necessary to prevent ozone crack initiation at the air-rubber interface, and that the ability of the antioxidant to migrate is curtailed when the number of carbon atoms constituting the N,N-substituents is in excess of 26, and further that when the number of carbon atoms in such substituents is less than 16 the additives are lost by volatilization from heating or simple aging, and thus cannot protect the product. However, regardless of the mechanism of protective action or the reasons therefore, p-phenylenediamine derivatives, in which the hydrocarbon substituents contain not less than 16 or more than 26 carbon atoms, and at least one of which substituents is an alkyl group on one of the nitrogens, represents the class of compounds which are effective as antioxidants.

To illustrate the observed critical nature of the number of carbon atoms in the alkyl substituents, and to show how such observed data fits the above hypothesis, there is presented herewith a diagram (FIGURE 1) showing the virtual immunity of GR-S 1500 type synthetic rubber protected from ozone cracking by 5 parts of

when the number of carbon atoms in "R+R'" of the formula (in which R and R' are hydrocarbon radicals and at least one of them is a secondary alkyl radical) is at least 16 and not more than 26. In this diagram an "A value" of 50 or less represents critical immunity from ozone attack; while at an "A value" above 500, the samples usually break during the dynamic testing and thus cannot be subjected to a full period of dynamic testing. When "A values" are obtained that lie from above 50 to about 500 the specimens can be fully tested to afford comparable data on crack depth, but the ozone protection is poor. The line "X" represents the loss of immunity to ozone attack after aging when the antiozidant is lost by volatilization; the line "Y" represents the loss of immunity to ozone attack when the molecular weight of the substituents is too great and the ability of the antiozidant to migrate to the surface is lost.

As stated above, data for "hot" GR-S (polymerized at 122° F. instead of 41° F. used for the "cold" GR-S) compounded with the new antiozidants were also obtained and were found to be practically identical with data for "cold" GR-S. The GR-S elastomers are considered to be neutral nonpolar elastomers. Hycar (18% acrylonitrile) was used to represent the class of neutral polar elastomers; since it consists of a copolymer of butadiene and acrylonitrile it contains the polar nitrile groups. As a representative of basic polar elastomers, a copolymer of butadiene and a methylvinylpyridine (Philprene VP) was tested with and without the new antiozidants. Further, an elastomer comprising a copolymer of butadiene-styrene-acrylic acid in the weight ratio of 75/23/2 was used to represent the class of acid polar elastomers. Comparison of the results attained, mutually and with the controls, shows that all four types of elastomers are highly protected against ozone by incorporation of three to five parts of the new antiozidants therein; and the same considerations show that natural rubber is similarly protected.

In addition to the examples given in the tables copolymers of styrene and butadiene were prepared which contained small amounts of copolymerized carbnoyl-containing monomers such as methylvinylketone, crotonaldehyde or methyl isopropenylketone and compounded with the antioxidants of this invention, and the results showed that these antiozidants are useful as additives for these carbonyl containing elastomers.

These and other elastomers may be employed as additives, e.g., plasticizers for plastomer products, for which polar elastomers are usually selected. In such cases ozone deterioration of the elastomer component is prevented by the antiozidants of this invention.

The samples shown in the tables cover the five principal types of elastomers, above described, but the range of elastomers, and plastomer combinations, protected against ozone attack by the present antiozidants is not limited thereto, as similar results have been obtained with other elastomers e.g., polybutadiene, butyl rubber, neoprene, etc. As also noted above, the GR-S 1500 used in the many examples in Tables I, II and IV contained antioxidant material capable of withstanding vulcanization, usually PBNA. Such antioxidant materials notably PBNA afford no protection against ozone attack of the principal products, nor do they enable the other antioxidants of Table I to do so. From certain of the observed data, however, it appears that in combination with the new antiozidants, the PBNA and similar antioxidant materials may have a synergistic effect enabling smaller quantities of the antiozidants of the present invention to effectively proect the products against ozone attack.

Variations in compounding of the elastomers can nullify the protective action of these antiozidants. For example, high amounts of waxes, plasticizers or stearic acid lower the effectiveness of our new additives in rubbers. Caution should be exercised by the compounder to avoid excessive amounts of such ingredients particularly where the elastomer is subjected to dynamic use.

In general lrom 0.5 to 5 parts of antiozidant per hundred of rubber is adequate for practice of the invention in protection of natural and synthetic rubbers against deterioration due to ozone attack.

These antiozidants have also been found to be effective in protection against ozone cracking of plastomers which have residual unsaturation or active hydrogens such as may be present in methylene or methinyl groups. Thus resins or plastomer compositions comprising polymers and copolymers of vinylchloride, vinylacetate, alkylacrylates, etc., in combination with unsaturated polymer ingredients, are subject to attack by ozone, and such attack is avoided when the new antiozidants are present in such compositions.

These new antiozidants have also been found effective in protection of elastomer dispersions such as latices of natural rubber, GR–S elastomers, neoprene, acrylonitrile copolymeric elastomers, and the like which are to be used for coating and film-forming purposes, e.g. for paper coatings, wall paints, etc. By incorporation of the new antiozidants in the latices together with the vulcanizing ingredients, the subsequently formed cured films therefrom are effectively protected against ozone cracking.

Herein the term elastomer is employed to designate an elastic polymer or macromolecule, whether a naturally-occuring material or a synthetic polymeric substance. Plastomer is defined as including both thermoset and thermoplastic high molecular weight resinous and plastic materials. These definitions follow those used by Harry L. Fisher, Industrial & Engineering Chemistry, volume 31, page 942 (1939).

I claim:

The compound N,N'-di-(3,5,5-trimethylcyclohexyl)-p-phenylenediamine.

References Cited in the file of this patent

UNITED STATES PATENTS

| | | |
|---|---|---|
| 1,550,749 | Shafer | Aug. 25, 1925 |
| 2,323,948 | Von Bramer et al. | July 13, 1943 |
| 2,384,141 | Soday | Sept. 4, 1945 |
| 2,435,246 | Strain | Feb. 3, 1948 |
| 2,435,411 | Soday | Feb. 3, 1948 |
| 2,498,630 | Thompson | Feb. 28, 1950 |
| 2,734,808 | Biswell | Feb. 14, 1956 |
| 2,779,789 | Rosenwald et al. | Jan. 29, 1957 |

OTHER REFERENCES

Shaw et al.: Rubber World, vol. 130, No. 5, pages 636 to 642.